(12) United States Patent
Gu et al.

(10) Patent No.: US 10,270,803 B2
(45) Date of Patent: Apr. 23, 2019

(54) METHOD AND APPARATUS FOR DETECTING MALWARE INFECTION

(71) Applicant: SRI International, Menlo Park, CA (US)

(72) Inventors: Guofei Gu, College Station, TX (US); Phillip A. Porras, Cupertino, CA (US); Martin W. Fong, Redwood City, CA (US)

(73) Assignee: SRI International, Menlo Park, CA (US)

(*) Notice: Subject to any disclaimer, the term of this patent is extended or adjusted under 35 U.S.C. 154(b) by 767 days.

(21) Appl. No.: 14/601,969

(22) Filed: Jan. 21, 2015

(65) Prior Publication Data

US 2016/0359870 A1    Dec. 8, 2016

Related U.S. Application Data

(63) Continuation of application No. 12/098,334, filed on Apr. 4, 2008, now Pat. No. 8,955,122.
(Continued)

(51) Int. Cl.
*H04L 29/00* (2006.01)
*H04L 29/06* (2006.01)
(Continued)

(52) U.S. Cl.
CPC .......... *H04L 63/145* (2013.01); *G06F 21/552* (2013.01); *G06F 21/564* (2013.01);
(Continued)

(58) Field of Classification Search
CPC ............... H04L 63/1416; H04L 63/145; H04L 63/1408; H04L 2463/144; H04L 63/1441;
(Continued)

(56) References Cited

U.S. PATENT DOCUMENTS

| 6,052,709 A | 4/2000 | Paul |
|---|---|---|
| 6,772,349 B1 | 8/2004 | Martin et al. |

(Continued)

FOREIGN PATENT DOCUMENTS

WO    WO 2103533 A1    12/2002

OTHER PUBLICATIONS

Martin Roesch, "Snort—Lightweight Intrusion Detection for Networks," Proceedings of LISA '99; 13th Systems Administration Conf., Seattle, WA, Nov. 7-12, 1999, pp. 229-238.

(Continued)

*Primary Examiner* — Jeffrey C Pwu
*Assistant Examiner* — Michael D Anderson
(74) *Attorney, Agent, or Firm* — Hickman Palermo Becker Bingham LLP; Christine E. Orich

(57) ABSTRACT

In one embodiment, the present invention is a method and apparatus for detecting malware infection. One embodiment of a method for detecting a malware infection at a local host in a network, includes monitoring communications between the local host and one or more entities external to the network, generating a dialog warning if the communications include a transaction indicative of a malware infection, declaring a malware infection if, within a predefined period of time, the dialog warnings includes at least one dialog warning indicating a transaction initiated at the local host and at least one dialog warning indicating an additional transaction indicative of a malware infection, and outputting an infection profile for the local host.

20 Claims, 9 Drawing Sheets

Related U.S. Application Data

(60) Provisional application No. 60/910,188, filed on Apr. 4, 2007.

(51) Int. Cl.
  *G06F 21/55* (2013.01)
  *G06F 21/56* (2013.01)
  G06F 11/34 (2006.01)
  G06F 21/57 (2013.01)

(52) U.S. Cl.
  CPC ........ *G06F 21/566* (2013.01); *H04L 63/1416* (2013.01); *G06F 11/3495* (2013.01); *G06F 21/577* (2013.01); *G06F 2221/2101* (2013.01); *H04L 63/1458* (2013.01); *H04L 2463/144* (2013.01)

(58) Field of Classification Search
  CPC . H04L 63/1433; H04L 63/1425; G06F 21/56; G06F 21/561; H04W 12/12
  USPC .......................................................... 726/23
  See application file for complete search history.

(56) References Cited

U.S. PATENT DOCUMENTS

| | | | |
|---|---|---|---|
| 6,973,577 | B1 | 12/2005 | Kouznetsov |
| 7,043,757 | B2 | 5/2006 | Hoefelmeyer et al. |
| 7,062,553 | B2 | 6/2006 | Liang |
| 7,093,239 | B1 | 8/2006 | van der Made |
| 7,140,044 | B2 | 11/2006 | Redlich et al. |
| 7,509,676 | B2 | 3/2009 | Trueba |
| 7,543,334 | B2 | 6/2009 | Vignoles et al. |
| 7,549,166 | B2 | 6/2009 | Baffes et al. |
| 7,594,267 | B2 | 9/2009 | Gladstone et al. |
| 7,594,270 | B2 | 9/2009 | Church et al. |
| 7,596,097 | B1 | 9/2009 | McCowan et al. |
| 7,640,346 | B2 | 12/2009 | Ottaviani et al. |
| 7,797,566 | B2 | 9/2010 | Dror et al. |
| 7,844,700 | B2 | 11/2010 | Marinescu et al. |
| 9,027,135 | B1 * | 5/2015 | Aziz ................... H04L 63/1408 726/23 |
| 2002/0078381 | A1 | 6/2002 | Farley et al. |
| 2002/0199120 | A1 | 12/2002 | Schmidt |
| 2004/0064537 | A1 | 4/2004 | Anderson et al. |
| 2004/0088546 | A1 | 5/2004 | Shah et al. |
| 2004/0205419 | A1 | 10/2004 | Liang et al. |
| 2004/0219159 | A1 | 11/2004 | Stewart et al. |
| 2004/0225877 | A1 | 11/2004 | Huang |
| 2005/0086499 | A1 | 4/2005 | Hoefelmeyer et al. |
| 2005/0177868 | A1 | 8/2005 | Kwan |
| 2006/0173854 | A1 | 8/2006 | Ottaviani et al. |
| 2006/0224724 | A1 | 10/2006 | Marinescu et al. |
| 2006/0265746 | A1 | 11/2006 | Farley et al. |
| 2006/0265747 | A1 | 11/2006 | Judge |
| 2007/0033645 | A1 | 2/2007 | Jones |
| 2007/0050777 | A1 | 3/2007 | Hutchinson et al. |
| 2007/0083931 | A1 | 4/2007 | Spiegel et al. |
| 2007/0123216 | A1 | 5/2007 | Cantini et al. |
| 2007/0136813 | A1 | 6/2007 | Wong |
| 2007/0169196 | A1 | 7/2007 | Dapp |
| 2007/0297333 | A1 | 12/2007 | Zuk et al. |
| 2008/0016386 | A1 | 1/2008 | Dror et al. |
| 2008/0046989 | A1 | 2/2008 | Wahl |
| 2008/0086434 | A1 | 4/2008 | Chesla |
| 2008/0155036 | A1 | 6/2008 | Pirzada et al. |
| 2008/0256619 | A1 | 10/2008 | Neystadt et al. |
| 2009/0019115 | A1 | 1/2009 | Larson et al. |
| 2009/0183233 | A1 | 7/2009 | Trueba |
| 2009/0210422 | A1 | 8/2009 | Chen et al. |
| 2009/0217341 | A1 | 8/2009 | Sun et al. |
| 2009/0240780 | A1 | 9/2009 | Brown et al. |
| 2009/0293122 | A1 | 11/2009 | Abdel-Aziz et al. |
| 2010/0031359 | A1 | 2/2010 | Alme |
| 2010/0218253 | A1 | 8/2010 | Sutton et al. |
| 2010/0289627 | A1 | 11/2010 | McAllister et al. |
| 2011/0209193 | A1 | 8/2011 | Kennedy |

OTHER PUBLICATIONS

Guofei Gu, et al., "BotHunter: Detecting Malware Infection Through IDS-Driven Dialog Correlation," Proc. of the 16th USENIX Sec. Sym., Boston, MA, Aug. 6-10, 2007, 16 pgs.

Ulf Lindqvist, et al., "Detecting Computer and Network Misuse . . . ," Proceedings of the 1999 IEEE Sym. on Security and Priv., Oakland, California, May 9-12, 1999, pp. 1-16.

* cited by examiner

| Local Host | Timer | E1 ⏱ | E2 | E3 | E4 | E5 |
|---|---|---|---|---|---|---|
| 192.168.12.1 | ⏱ | $A_a ... A_b$ | | | | |
| 192.168.10.45 | ◕ | | $A_c ... A_d$ | | $A_e ... A_f$ | |
| 192.168.10.66 | ◕ | | $A_g$ | | | |
| 192.168.12.46 | ◕ | | | | $A_h ... A_i$ | $A_j ... A_k$ |
| ⋮ | | | | | | |
| 192.168.11.123 | ⏱ ◕ | $A_l$ | $A_m ... A_n$ | $A_o$ | | |

METHOD AND APPARATUS FOR DETECTING MALWARE INFECTION

CROSS REFERENCE TO RELATED APPLICATIONS

This application is a continuation of U.S. patent application Ser. No. 12/098,334, filed Apr. 4, 2008, U.S. Pat. No. 8,955,122, issue date: Feb. 10, 2015, which claims the benefit of U.S. Provisional Patent Application No. 60/910,188, filed Apr. 4, 2007, each of which is herein incorporated by reference in its entirety.

REFERENCE TO GOVERNMENT FUNDING

This invention was made with Government support under contract number W911NF-06-1-0316 awarded by the Army Research Office. The Government has certain rights in this invention.

FIELD OF THE INVENTION

The present invention generally relates to network security, and more particularly relates to the detection of malware infection.

BACKGROUND OF THE DISCLOSURE

Over the last decade, malicious software ("malware") has become a primary source of most of the scanning, backscatter, and direct attacks taking place across the Internet. Among the various forms of malware, botnets represent some of the biggest threats to computer assets. A bot is a self-propagating application that infects vulnerable hosts through direct exploitation or Trojan insertion. Bots distinguish themselves from other forms of malware by their ability to establish a command and control (C&C) channel, through which bots can be updated and directed. Once collectively under the control of a C&C server, a collection of bots forms a botnet, or a collection of slave computing and data assets. Botnets are often sold and traded for a variety of illicit activities, including information and computing source theft, SPAM production, phishing attack hosting, or mounting of distributed denial-of-service (DDoS) attacks.

The bot infection process spans several diverse transactions that occur in multiple directions and potentially involves several active participants. The ability to accurately detect all of these transactions, and to predict the order and time-window in which they are recorded, eludes conventional intrusion detection systems (IDSs) and intrusion prevention systems (IPSs).

Thus, there is a need in the art for a method and apparatus for detecting malware infection.

SUMMARY OF THE INVENTION

In one embodiment, the present invention is a method and apparatus for detecting malware infection. One embodiment of a method for detecting a malware infection at a local host in a network, includes monitoring communications between the local host and one or more entities external to the network, generating a dialog warning if the communications include a transaction indicative of a malware infection, declaring a malware infection if, within a predefined period of time, the dialog warnings includes at least one dialog warning indicating a transaction initiated at the local host and at least one dialog warning indicating an additional transaction indicative of a malware infection, and outputting an infection profile for the local host.

BRIEF DESCRIPTION OF THE DRAWINGS

The teachings of the present invention can be readily understood by considering the following detailed description in conjunction with the accompanying drawings, in which:

FIG. 8 illustrates one exemplary embodiment of a network dialog correlation matrix, according to the present invention.

To facilitate understanding, identical reference numerals have been used, where possible, to designate identical elements that are common to the figures.

DETAILED DESCRIPTION

In one embodiment, the invention is a method and apparatus for detecting malware infection. Embodiments of the invention detect successful bot infections through the communication sequences that occur during the infection process. In one embodiment, a bot infection is modeled as a set of loosely ordered communication flows that are exchanged between a valid internal host and one or more external entities. An "evidence trail" of relevant infection events is collected on a per-host basis and examined for a threshold combination of sequences.

In one embodiment, an infection sequence is modeled as a composition of participants and a loosely ordered sequence of exchanges: I=<A, V, C, V', E, $\overline{D}$>, where A represents an attacker (i.e., a source of a bot infection), V represents a victim (i.e., a host infected with a bot), E represents an egg download location, C represents a C&C server, and V' represents the next propagation target (i.e., of the victim, V). $\overline{D}$ represents the bot infection dialog.

Figure 1:
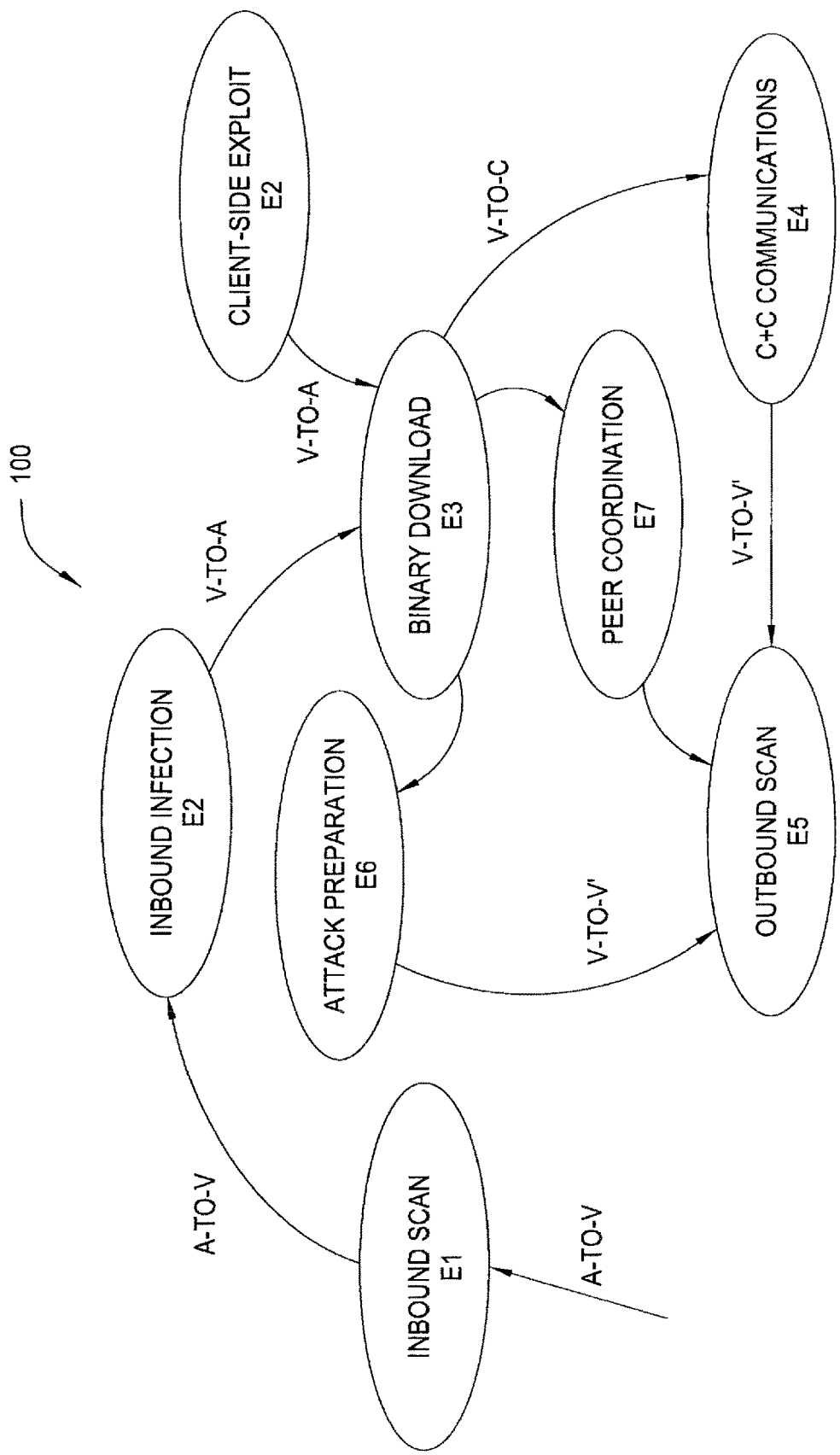
FIG. 1 is a schematic diagram illustrating one embodiment of a bot infection dialog model that may be implemented in accordance with the present invention.

FIG. 1 is a schematic diagram illustrating one embodiment of a bot infection dialog model 100 that may be implemented in accordance with the present invention. Specifically, the model 100 is used for assessing bidirectional flows across a network boundary.

In the illustrated embodiment, the model 100 comprises a set of seven potential dialog transactions: external-to-internal (i.e., attacker-to-victim) inbound scan (E1), external-to-internal inbound exploit and/or internal (client-side) exploit (e.g., for spam bots) (E2), internal-to-external (i.e., victim outward) binary (or "egg") download (E3), internal-to-external C&C communication (e.g., for traditional C&C botnets) (E4), internal-to-external outbound infection scanning (E5), internal-to-external attack preparation (e.g., for spam bots and peer-to-peer botnets) (E6), and internal-to-external peer coordination (e.g., for peer-to-peer botnets) (E7). At least some of these potential dialog transactions may be observed during the bot infection life cycle, depending on the type of bot. For instance, transactions E1 through E5 might indicate infection by a traditional C&C botnet (described above), while the addition of transactions E6 and/or E7 might indicate infection by a spam bot (i.e., a bot that propagates through email uniform resource locator link downloads) or a peer-to-peer botnets (i.e., a botnet that propagates via a peer-based coordination scheme) The model 100 is not intended to provide a strict ordering of events, but rather to capture a typical infection dialog (subject to some exceptions described in further detail below).

The model 100 includes early initial scanning (transaction E1), which is often a preceding observation that typically occurs in the form of Internet Protocol (IP) sweeps that target a relatively small set of selected vulnerable ports. The model 100 also includes internal-to-external attack propagation (transaction E5). As illustrated, once the binary is downloaded by the victim (transaction E3), there are three potential paths along which the dialog may continue to internal-to-external attack propagation: (1) the victim may proceed to C&C server coordination (transaction E4) before attempting attack propagation (transaction E5); (2) the victim may proceed to attack preparation (transaction E6) before attempting attack propagation (transaction E5); or (3) the victim may proceed to peer coordination (transaction E7) before attempting attack propagation (transaction E5). If the victim proceeds directly to outbound scanning and attack propagation (transaction E5), this represents a classic worm infection.

The model 100 is robust to the absence of some dialog events, allows for multiple contributing candidates for each of the dialog transactions, and does not require strict sequencing on the order of which outbound dialog transactions are conducted. Moreover, the model 100 is robust to inbound dialog transaction (i.e., E1 and E2 transactions) detection failures, which may be the result of insufficient IDS fidelity or malware infections that occur through avenues other than direct remote exploit.

In one embodiment, the model 100 addresses issues of sequence order and transaction omission by using a weighted event threshold system, discussed in greater detail below. This weighted system captures the minimum necessary and sufficient sparse sequences of transactions under which a bot profile can be declared. For example, one can define a weighting and threshold scheme for the appearance of each transaction such that a minimum set of transaction combinations is required for bot detection. For instance, in one embodiment, declaration of infection by a spam bot or a peer-to-peer botnet requires detection of at least two transactions from among transactions E5 through E7.

In one embodiment of the present invention, a declaration of bot infection requires a minimum of: (1) evidence of local host infection AND evidence of outward bot coordination or attack propagation; or (2) at least two distinct signs of outward bot coordination or attack propagation.

Figure 2:
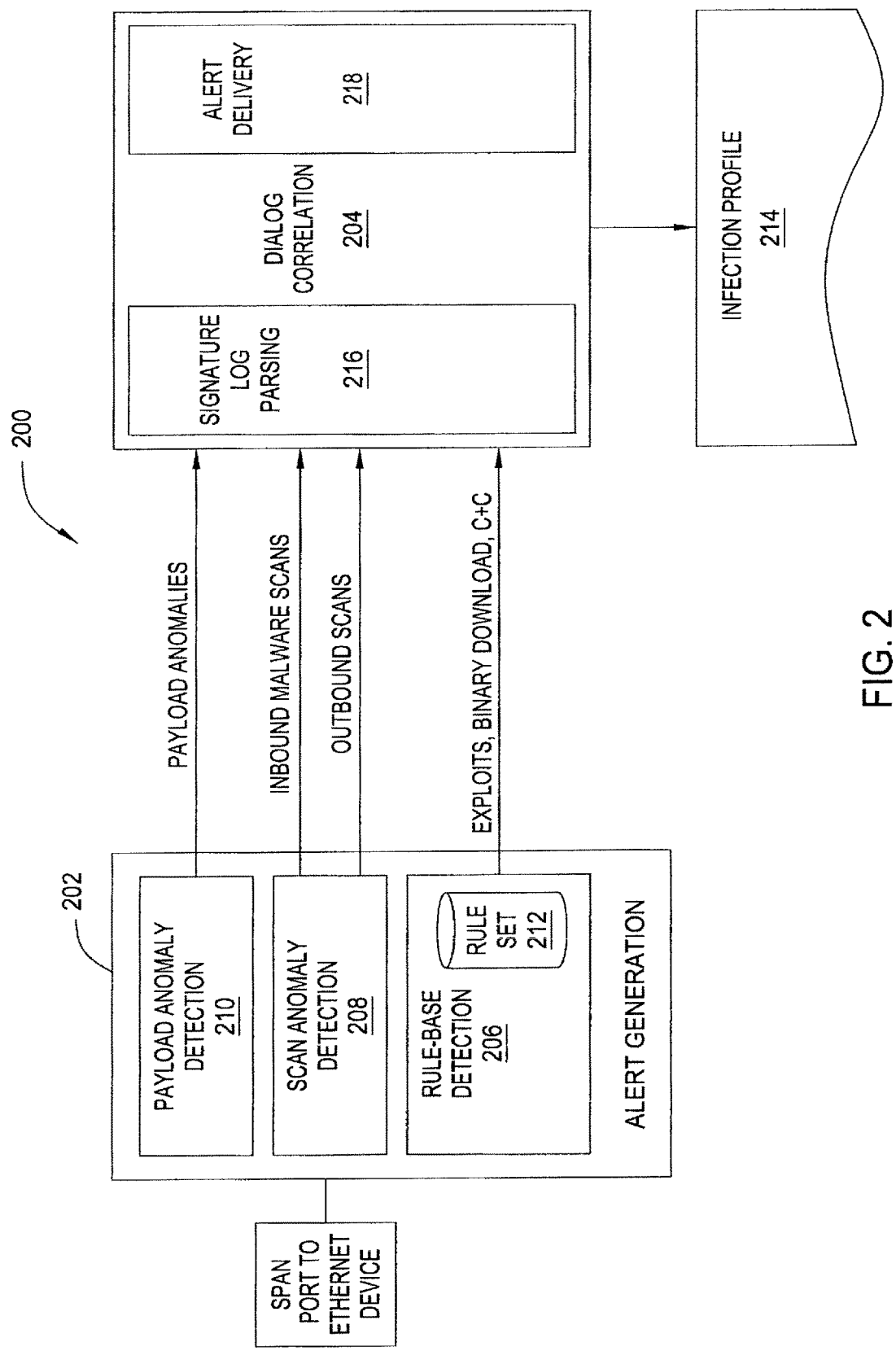
FIG. 2 is a schematic diagram illustrating one embodiment of a system for detecting bot infection, according to the present invention.

FIG. 2 is a schematic diagram illustrating one embodiment of a system 200 for detecting bot infection, according to the present invention. In one embodiment, the system 200 is a passive monitoring system that is deployed at the boundary of a network, thereby providing the system 200 with a vantage point from which to observe the network communication flows that occur between the network's internal hosts and another network (e.g., the Internet). In this way, the system is positioned to observe and detect the bidirectional warning signs of local host infections.

In one embodiment, the system 200 comprises a network intrusion alert generation engine 202 and a dialog correlation engine 204. The alert generation engine 202 is configured to observe network communication flows occurring between the network's internal hosts and the Internet, and to generate alerts for any communication flows that may be indicative of a bot infection. These alerts are output to the dialog correlation engine 204 for further analysis and identification of actual bot infections.

In one embodiment, the alert generation engine 202 comprises three components that monitor inbound and outbound traffic flows: a rule-based intrusion detection/prevention system (IDS/IPS) 206, a statistical scan anomaly detection engine 208, and a statistical payload anomaly detection engine 210. Each of these three components generates dialog warnings in response to detected dialog transactions, which are output to the dialog correlation engine 204 for further analysis.

In one embodiment, the IDS/IPS 206 is a system that performs packet logging and real-time traffic analysis for observed communication flows. For instance, one example of a system that may be implemented in the IDS/IPS 206 is the open source release of Snort described by M. Roesch in "Snort—Lightweight Intrusion Detection for Networks," Proceedings of USENIX LISA '99, 1999. The IDS/IPS 206 relies on a ruleset 212 or collection of malware-related signatures to identify certain bot infection dialog transactions. In one embodiment, the ruleset 212 includes signatures for detecting at least one of the following dialog transactions: inbound exploit usage (i.e., E1 and E2 transactions), binary downloading (i.e., E3 transactions), and C&C communication patterns (i.e., E4 transactions). The IDS/IPS 206 generates dialog warnings in response to detected dialog transactions, which are output to the dialog correlation engine 204 for further analysis.

In one embodiment, the scan anomaly detection engine 208 is a system that monitors communication flows for evidence of inbound malware scans (i.e., E1 transactions) and outbound infection scans (i.e., E5 transactions). For instance, one example of a system that may be implemented in the scan anomaly detection engine 208 is the Statistical sCan Anomaly Detection Engine (SCADE) developed at the Georgia Institute of Technology. In each case, the scan anomaly detection engine 208 generates an anomaly score that is used to produce a dialog warning for output to the dialog correlation engine 204.

In one embodiment, the payload anomaly detection engine 210 is a system that provides dialog warnings in response to observed inbound packets that indicate inbound infection or exploit (i.e., E2 transactions). For instance, one example of a system that may be implemented in the payload anomaly detection engine 210 is the Statistical PayLoad Anomaly Detection Engine (SLADE) developed at the Georgia Institute of Technology. The payload anomaly detection engine 210 outputs dialog warnings indicative of inbound infection or exploit transactions to the dialog correlation engine 204 for further analysis.

In one embodiment, the dialog correlation engine 204 maintains an assessment of all dialog exchanges between all local hosts communicating with external entities across the Internet, based on the dialog warnings received from the IDS/IPS 206, the scan anomaly detection engine 208, and the payload anomaly detection engine 210. In one embodiment, the dialog correlation engine 204 maintains a network dialog correlation matrix, described in greater detail below, that manages the state of all dialog warnings produced per local host. When a combination of the dialog warnings for a given local host exceeds a weighted threshold, the dialog correlation engine 204 produces a bot infection profile 214 for the local host. The bot infection profile 214 may be outputted for review, for example by a network administrator. In one embodiment, the bot infection profile 214 includes at least one of the following: a confidence score indicative of a likelihood that the local host is infected with a bot, the IP address of the local host, the IP addresses of the sources of the bot infection (i.e., the attackers, listed by prevalence), the IP addresses of the C&C server (listed by prevalence), the complete evidence trail (La, signatures, scores, ports, etc.), and the time range of the bot infection.

In one embodiment, the dialog correlation engine 204 comprises a signature log parser 216 and an alert delivery engine 218. The alert delivery engine 218 outputs bot infection profiles to a remote repository for global collection and evaluation of bot activity. In one embodiment, the alert delivery engine 218 first anonymizes all source-local addresses reported within a bot infection profile, and then delivers the bot infection profile to the data repository through a TLS over Tor (onion routing protocol) network connection. In one embodiment, the delivered bot infection profiles are made available for use in large-scale assessment of bot dialog behavior, in large-scale assessment of the sources and volume of various bot infections, and for surveying where C&C servers and exploit sources are located.

As discussed above, one embodiment of a system 200 for detecting bot infections relies in part on the detection of inbound exploits, binary downloads, and C&C communications. In one embodiment, rules for detecting these transactions are divided into four separate rule files: (1) a first rule file covering 1046 inbound exploits (E2) rules; (2) a second rule file covering 66 binary download (E3) rules; (3) a third rule file covering 246 C&C communications (E4) rules; and (4) 20 outbound scan (E5) rules. Thus, a total of 1378 heuristics are included in these rule files. These rules are selected specifically for their relevance to malware identification.

Figure 3:
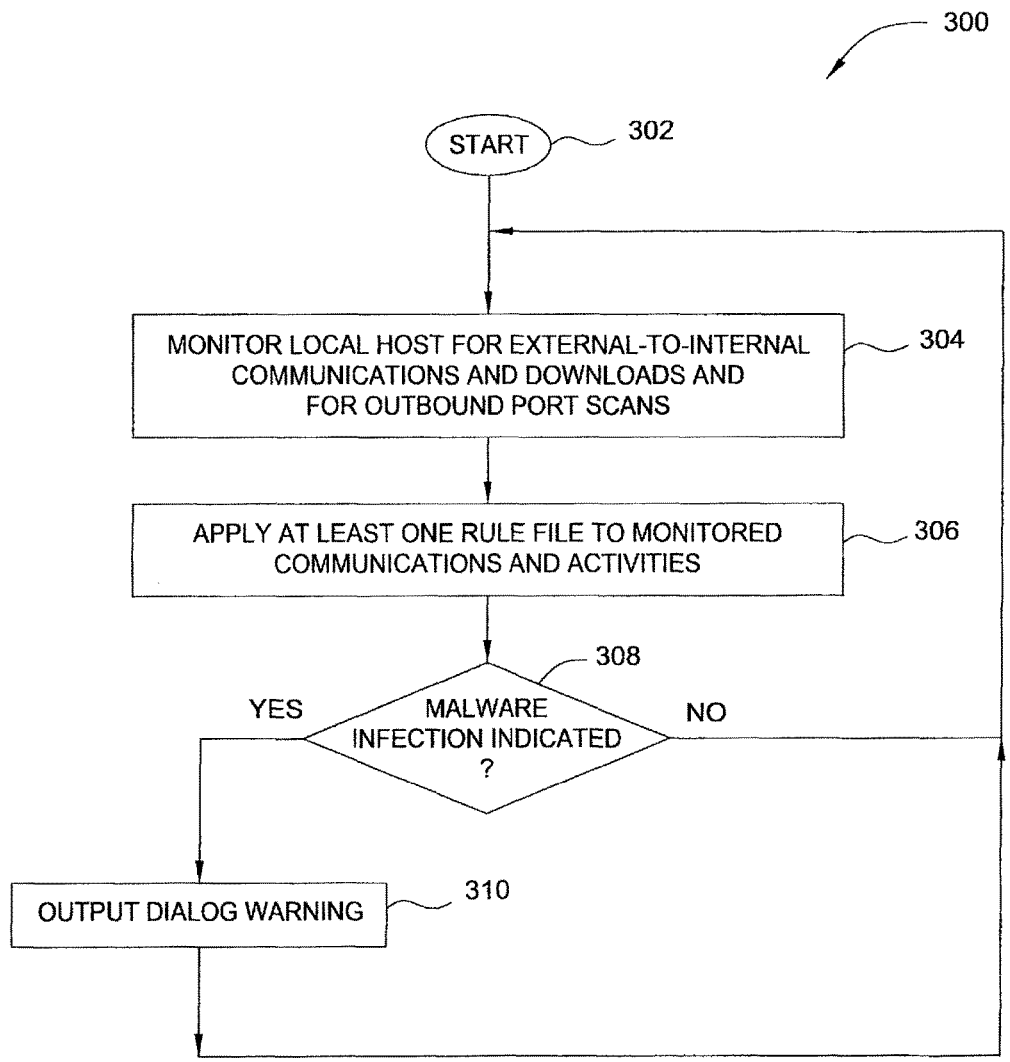
FIG. 3 is a flow diagram illustrating one embodiment of a method for generating a dialog warning indicative of an inbound exploit, a binary download, a C&C communication, or an outbound port scan at a given host, according to the present invention.

FIG. 3 is a flow diagram illustrating one embodiment of a method 300 for generating a dialog warning indicative of an inbound exploit (i.e., an E2 transaction), a binary download (i.e., an E3 transaction), a C&C communication (i.e., an E4 transaction), or an outbound port scan/attack preparation activity (i.e., an E5 or E6 transaction) at a given host, according to the present invention. The method 300 may be implemented, for example, at the rule-based detection engine 206 of FIG. 2.

The method 300 is initialized at step 302 and proceeds to step 304, where the method 300 monitors a local host for external-to-internal communications and downloads and for outbound port scans. The method 300 the proceeds to step 306 and applies at least one rule file to the monitored communications and activities. In one embodiment, the at least one rule file is at least one of the four rule files described above.

The first rule file focuses on substantially the full spectrum of external-to-internal exploit injection attacks. In one embodiment, the first rule file is periodically augmented with rules derived from experimental observation of live malware infection attempts.

The second rule file focuses directly on malware binary executable download events from external sites to internal networks. In one embodiment, the second rule file covers a plurality of malicious binary executable downloads and download acknowledgement events.

The third rule file focuses on internally initiated bot C&C dialog and acknowledgement exchanges. In one embodiment, particular emphasis is placed on Internet relay chat (IRC) and uniform resource locator (URL)-based bot coordination. Further embodiments cover Trojan backdoor communications and popular bot commands built by keyword searching across common majr bot families and their variants.

The fourth rule file focuses on detection of well-known internal-to-external backdoor sweeps, although the scan anomaly detection engine 208 of FIG. 2 provides more in-depth detection for general outbound port scanning.

In step 308 the method 300 determines, in accordance with application of the rule file(s), whether a malware infection is indicated. If the method 300 concludes in step 308 that a malware infection is not indicated, the method 300 returns to step 304 and proceeds as described above to monitor the local host.

Alternatively, if the method 300 concludes in step 308 that a malware infection is indicated, the method 300 proceeds to step 310 and outputs a dialog warning for further analysis (e.g., by the dialog correlation engine 204 of FIG. 2). The method 300 then returns to step 304 and proceeds as described above to monitor the local host.

As discussed above, one embodiment of a system 200 for detecting bot infections relies in part on the detection of inbound scan attempts. In one embodiment, inbound scan detection involves tracking only scans that are specifically targeted to internal hosts, thereby bounding memory usage to the number of internal hosts. In a further embodiment, inbound scan detection is based on failed connection attempts, thereby narrowing processing to specific packet types that provide failed connection indications.

Figure 4:
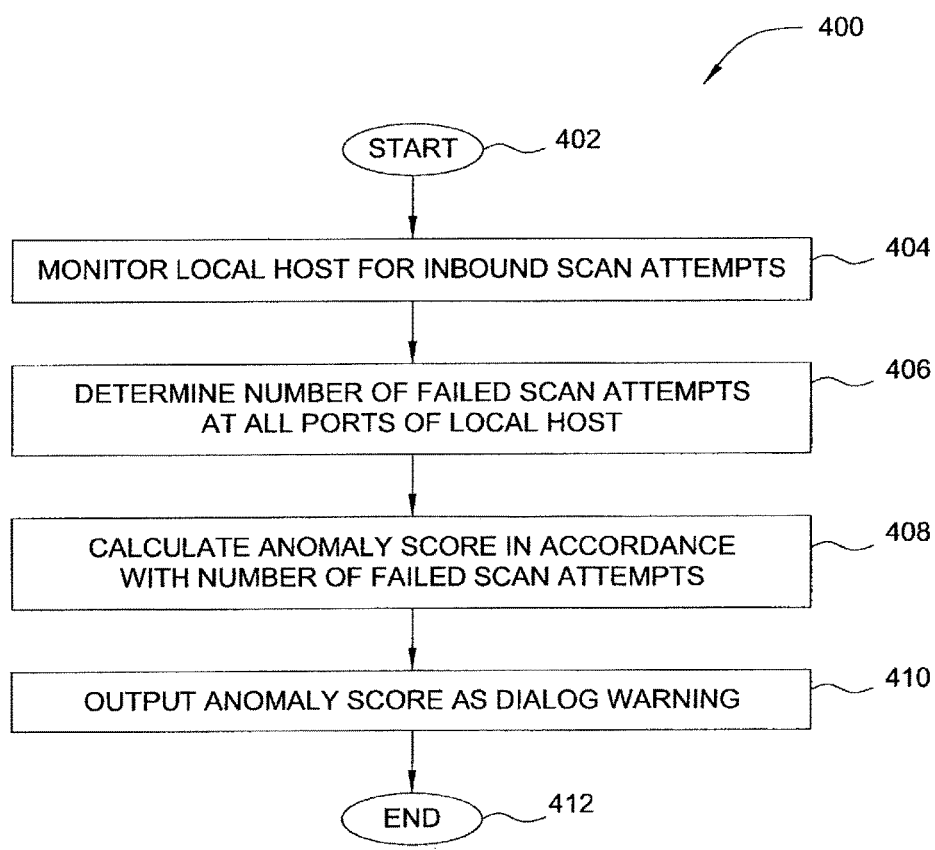
FIG. 4 is a flow diagram illustrating one embodiment of a method for generating a dialog warning indicative of an inbound scan attempt at a given host, according to the present invention.

FIG. 4 is a flow diagram illustrating one embodiment of a method 400 for generating a dialog warning indicative of an inbound scan attempt (i.e., an E1 transaction) at a given host, according to the present invention. The method 400 may be implemented, for example, at the scan anomaly detection engine 208 of FIG. 2.

The method 400 is initialized at step 402 and proceeds to step 404, where the method 400 monitors a given local host for inbound scan attempts over a predefined window of time. In step 406, the method 400 determines the number of failed scan attempts at all ports of the local host during the predefined window of time. In one embodiment, the method 400 defines two types of ports: high-severity (HS) ports representing highly vulnerable and commonly exploited services (e.g., 80/HTTP, 125, 1025/DCOM, 445/NetBIOS, 5000/UPNP, 3127/MyDoom, etc.); and low-severity (LS) ports representing all other ports. In one particular embodiment, 26 TCP and 4 UDP are defined as HS ports, while all other ports are defined as LS ports. Separate totals are maintained for the number, $F_{hs}$, of cumulative failed attempts at high-severity ports and the number, $F_{is}$, of cumulative failed attempts at low-severity ports.

In step 408, the method 400 calculates an anomaly score, s, for failed scan attempts at the local host. In one embodiment, calculation of the anomaly score is weighted toward the detection of malware-specific scanning patterns (i.e., toward detection of scans involving the ports most often used by malware). Different weights are thus assigned to failed scan attempts to different types of ports. Thus, an anomaly scores, s, for the local host can be calculated as:

$$S = w_1 F_{hs} + w_2 F_{iS} \qquad \text{(EQN. 1)}$$

where $w_1$ is the weight associated with high-severity ports, and $w_2$ is the weight associated with low-severity ports.

In step 410, the method 400 outputs the anomaly score, s, as a dialog warning for further analysis (e.g., by the dialog correlation engine 204 of FIG. 2). The method 400 then terminates in step 412.

Recent measurement studies suggest that modern bots are packaged with approximately fifteen exploit vectors on average to improve opportunities for exploitation. Depending on whether the attacker scans ports synchronously or asynchronously, it is likely that a number of failed connection attempts will be observed before a local host is successfully infected. The method 400 can detect these types of inbounds scans and generate dialog warnings, thereby providing a potential early bound on the start of the bot infection, should the detected scan(s) eventually lead to a successful bot infection.

As also discussed above, one embodiment of a system 200 for detecting bot infections relies in part on the detection of outbound scans. In one embodiment, outbound scan detection is based on a voting scheme (AND, OR, or MAJORITY) of three parallel anomaly detection models that track all external outbound connections from a given local host.

Figure 5:
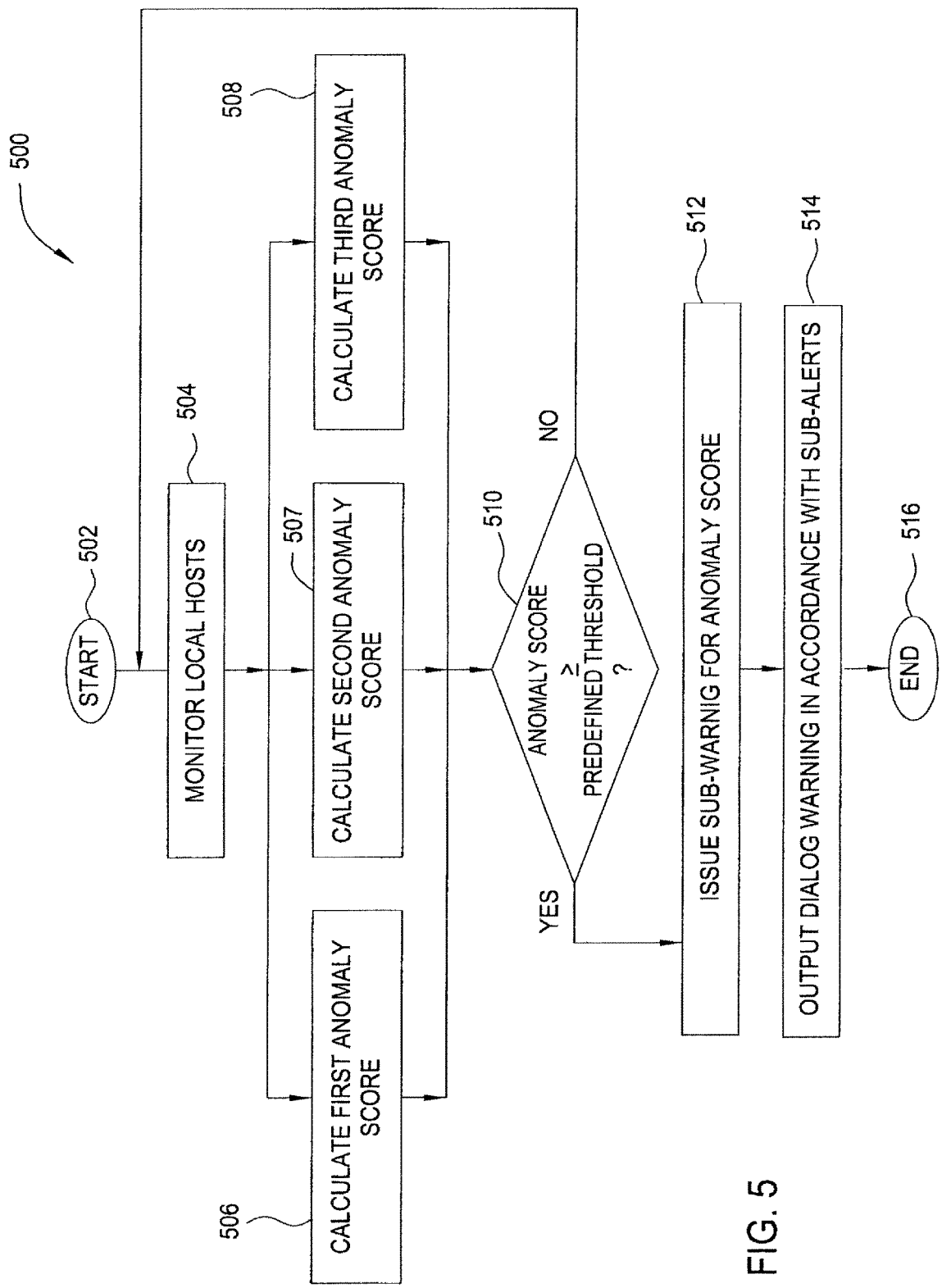
FIG. 5 is a flow diagram illustrating one embodiment of a method for generating a dialog warning indicative of an outbound scan at a given host, according to the present invention.

FIG. 5 is a flow diagram illustrating one embodiment of a method 500 for generating a dialog warning indicative of an outbound scan/attack preparation action (i.e., an E5 or E6 transaction) at a given host, according to the present invention. The method 500 may be implemented, for example, at the scan anomaly detection engine 208 of FIG. 2.

The method 500 is initialized at step 502 and proceeds to step 504, where the method 500 monitors the local hosts for evidence of outbound scans. In step 506, the method 500 calculates a first anomaly score, $s_1$, in accordance with the outbound scan rate. Specifically, the first anomaly score represents local hosts that are detected as operating high scan rates across large sets of external addresses.

In step 507, the method 500 calculates a second anomaly score, $s_2$, in accordance with the outbound connection failure rate. Specifically, the second anomaly score represents abnormally high connection failure rates and is weighted with sensitivity to HS port usage. In one embodiment, the second anomaly score is calculated as:

$$S_2 = (w_1 F_{hs} + w_2 F_{is})/C \qquad \text{(EQN. 2)}$$

where C is the total number of scans from a given local host within a predefined window of time.

In step 508, the method 500 calculates a third anomaly score, $s_3$, in accordance with the normalized entropy of scan target distribution. Specifically, the third anomaly score calculates a Zipf (power-law) distribution of outbound address connection patterns. A uniformly distributed scan target pattern provides an indication of a potential outbound scan. In one embodiment, the third anomaly score is calculated based on normalized entropy as:

$$s_3 = \frac{H}{\ln(m)} \qquad \text{(EQN. 3)}$$

where the entropy of scan target distribution is:

$$H = -\Sigma_{i=1}^{m} p_i \ln(p_i) \qquad \text{(EQN. 4)}$$

m is the total number of scan targets, and $p_i$ if the percentage of the scans occurring at target i.

Having calculated the first, second, and third anomaly scores in steps 506-508, the method 500 proceeds to step 510 and determines, for each of the anomaly scores, whether the anomaly score is greater than or equal to a predefined threshold. If the method 500 concludes in step 510 that the anomaly score is not greater than or equal to the predefined threshold, the method 500 returns to step 504 and continues to monitor the local hosts.

Alternatively, if the method 500 concludes in step 510 that the anomaly score is greater than or equal to the predefined threshold, the method 500 proceeds to step 512 and issues a sub-warning for the anomaly score. In step 514, the method 500 outputs a dialog warning (e.g., to the dialog correlation engine 204 of FIG. 2) in accordance with the sub-warnings for those of the first, second, and third anomaly scores that satisfy the predefined threshold (i.e., from step 510). The dialog warning is generated in accordance with a voting scheme (i.e., AND, OR, or MAJORITY). For example, the AND rule dictates that a dialog warning should be issued (e.g., to the dialog correlation engine 204 of FIG. 2) when sub-warnings have been issued for all three of the first, second, and third anomaly scores. In one embodiment, the voting scheme is user-configurable. The method 500 then terminates in step 516.

As discussed above, one embodiment of a system 200 for detecting bot infections relies in part on the detection of payload exploits. In one embodiment, payload exploit detection involves examining the payload of every request packet sent to services on monitored local hosts.

Figure 6:
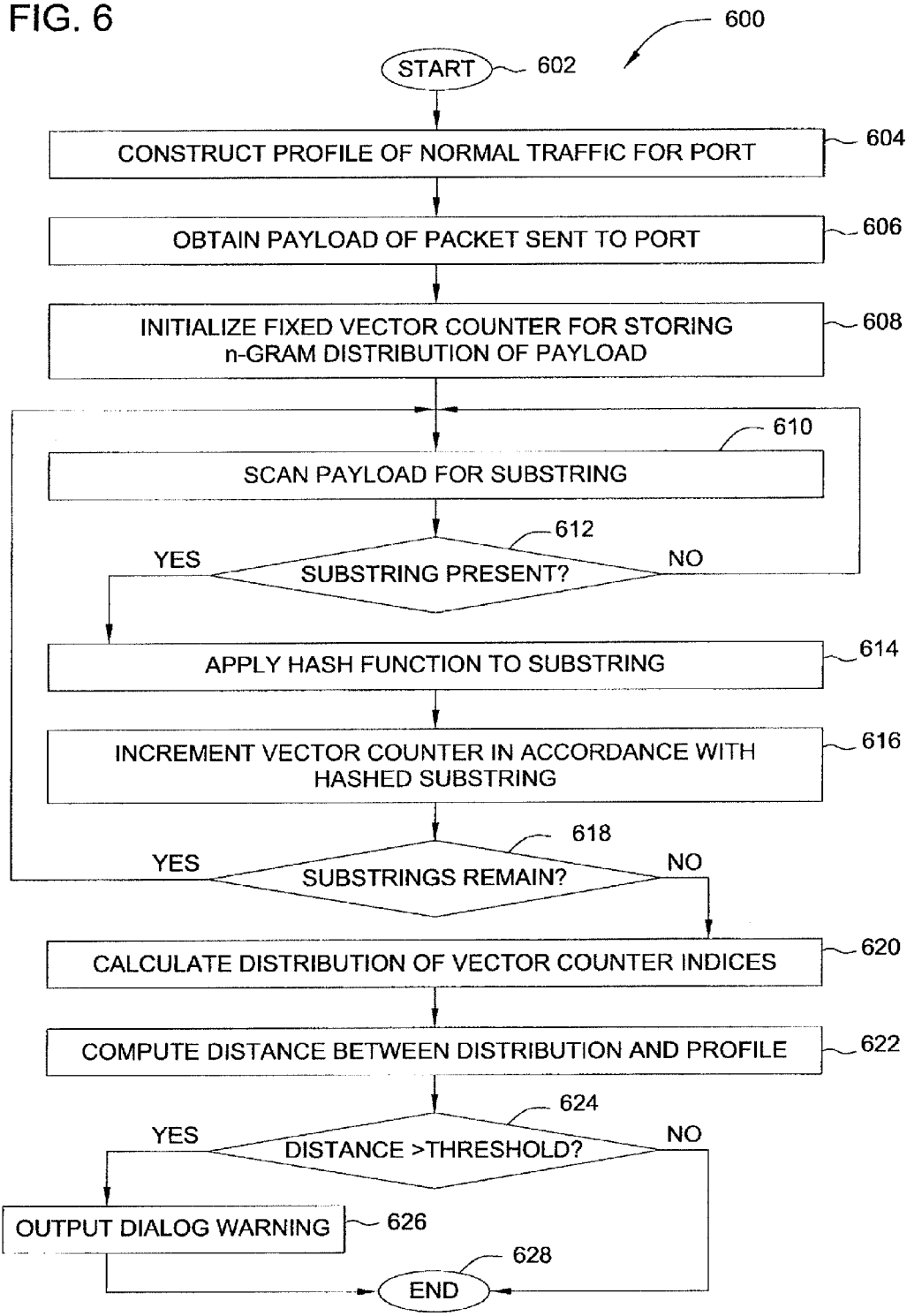
FIG. 6 is a flow diagram illustrating one embodiment of a method for generating a dialog warning indicative of an inbound payload exploit at a given host, according to the present invention.

FIG. 6 is a flow diagram illustrating one embodiment of a method 600 for generating a dialog warning indicative of an inbound payload exploit (i.e., an E2 transaction) at a given host, according to the present invention. The method 400 may be implemented, for example, at the scan anomaly detection engine 208 of FIG. 2.

The method 600 is initialized at step 602 and proceeds to step 604, where the method 600 constructs a profile of normal traffic for a service/port (e.g., HTTP) at a given local host. In one embodiment, the profile is constructed by calculating the mean, $y_i$, and standard deviation, $\sigma_i$, of the feature vector of normal traffic to the port.

In step 606, the method 600 obtains the payload of a packet sent to the port. In step 608, initializes a fixed vector counter for storing the n-gram distribution of the payload. The n-gram distribution represents the occurrence frequency of possible n-byte sequences in the payload. In one embodiment, the size of the vector counter is v (e.g., 2,000); thus, v n-byte sequences are possible.

In step 610, the method 600 scans the payload for an n-gram substring, str. In step 612, the method 600 determines whether the substring, str, is present. If the method 600 concludes in step 612 that the substring, str, is not present, the method 600 returns to step 610 and scans the payload for a next n-gram substring, str.

Alternatively, if the method 600 concludes in step 612 that the substring, str, is present, the method 600 proceeds to step 614 and applies a universal hash function h( ) to the substring, str. The method 600 then proceeds to step 616 and increments the vector counter at the vector space indexed by h(str) mod v.

In step 618, the method determines whether any n-gram substrings remain to be scanned in the payload. If the method 600 concludes in step 618 that there are n-gram substrings remaining to be scanned, the method 600 returns to step 610 and scans the payload for a next n-gram substring, str.

Alternatively, if the method 600 concludes in step 618 that there are no n-gram substrings remaining to be scanned, the method 600 proceeds to step 620 and calculates the distribution of the hashed n-gram indices within the vector space, v. If F is defined as the feature space of an n-gram byte distribution anomaly detection scheme having a total of $256^n$ distinct features, then F' is defined as the feature space of an n-gram byte distribution anomaly detection scheme having a total of v distinct features. Thus, the hash function, h( ) is a mapping from F to the smaller F' (i.e., h: F→F'). The method 600 therefore uses a "lossy" n-gram frequency (with the help of hash mapping) within feature space F', instead of using a more accurate but more costly (computationally and storage-wise) n-gram frequency within the feature space F'.

In step 622, the method 600 computes a deviation distance, d(x,y), of the payload from the profile of normal traffic constructed in step 604. In one embodiment, this distance is computed as a simplified Mahalanobis distance: aggregates the weighted scores of each dialog warning and declares a local host to be the victim of a bot infection when a minimum combination of dialog transactions is found to occur within a temporal window.

Figure 7:
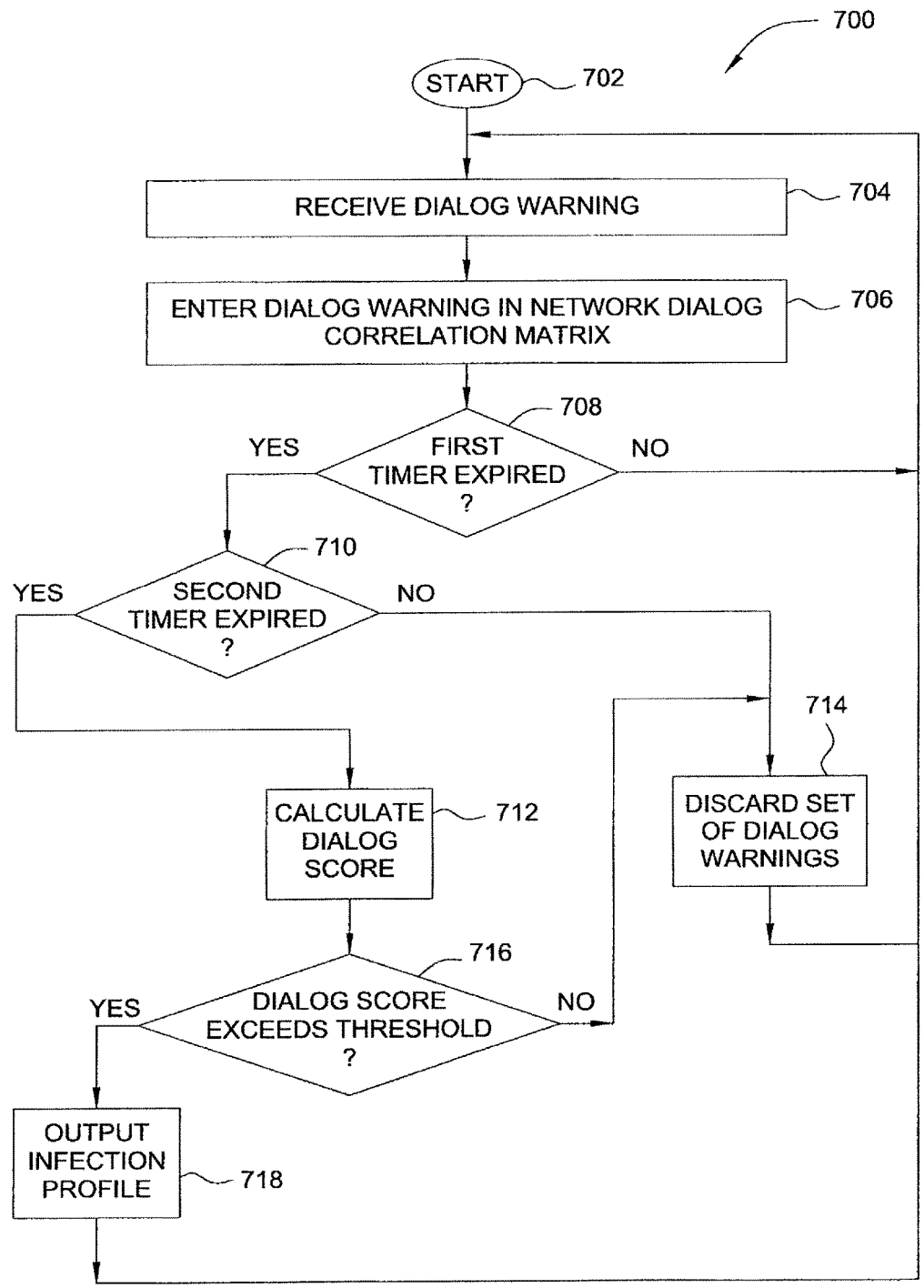
FIG. 7 is a flow diagram illustrating one embodiment of a method for correlating dialog warnings, according to the present invention.

FIG. 7 is a flow diagram illustrating one embodiment of a method 700 for correlating dialog warnings, according to the present invention. The method 700 may be implemented, for example, at the dialog correlation engine 204 of FIG. 2.

The method 700 is initialized at step 702 and proceeds to step 704, where the method 700 receives a dialog warnings (e.g., from one of the components of the intrusion alert generation engine 202). In step 706, the method 700 enters the dialog warning in a data structure, referred to herein as a "network dialog correlation matrix."

FIG. 8 illustrates one exemplary embodiment of a network dialog correlation matrix 800, according to the present invention. Each row of the network dialog correlation matrix 800 corresponds to a summary of the ongoing dialog warnings that are being generated between an individual local host and other external entities. Most of the columns of the network dialog correlation matrix 800 correspond to the seven classes of dialog warnings discussed herein (i.e., E1 through E7 transactions, although only E1 through E5 are illustrated in FIG. 8). Rows and columns of the network dialog correlation matrix 800 are allocated dynamically as dialog warnings are received. Each cell of the network dialog correlation matrix 800 corresponds to one or more (possibly aggregated) dialog warnings that map into one of the five dialog warning classes. The network dialog correlation matrix 800 dynamically grows when new activity involving a local host is detected and shrinks when the observation window reaches an interval expiration, as discussed in further detail below. In one embodiment, the method 700 employs an interval-based pruning algorithm that removes old dialog from the network dialog correlation matrix 800.

Referring back to FIG. 7, once the network dialog correlation matrix is updated with the new dialog warning, the method 700 proceeds to step 708 and determines whether a first expiration interval has expired. In one embodiment, each dialog in the network dialog correlation matrix is associated with two expiration intervals: a first expiration interval corresponding to a "soft prune timer" (i.e., the open-faced clocks in FIG. 8); and a second expiration interval corresponding to a "hard prune timer" (i.e., the shaded clocks in FIG. 8). The soft prune timer represents a first fixed temporal window that is user-configurable to enable tighter pruning interval requirements for higher production dialog warnings (for instance, inbound scan warnings are expired more quickly by the soft prune timer). The hard prune timer represents a second fixed temporal interval (longer than the first fixed temporal window) over which dialog warnings are allowed to aggregate, the end of which results in the calculation of a threshold score.

If the method 700 concludes in step 708 that the first expiration interval (i.e., the soft prune timer) has not expired, the method 700 returns to step 704 and proceeds as described above to await the next dialog warning. Alternatively, if the method 700 concludes in step 708 that the first expiration interval has expired, the method 700 proceeds to step 710 and determines whether a second expiration interval (i.e., the hard prune timer) has expired.

If the method 700 concludes in step 710 that the second expiration interval has not expired, the method 700 proceeds to step 714 and discards the set of dialog warnings associated with the received dialog warning (for lack of sufficient evidence), before returning to step 704 to await the next dialog warning. For instance, the dialog represented by the first row of FIG. 8 (i.e., for local host 192.168.12.1), where the only dialog warning is for an E1 transaction, would be discarded.

Alternatively, if the method 700 concludes in step 710 that the second expiration interval has expired, the method 700 proceeds to step 712 and $$d(x, y) = \sum_{i=0}^{v-1} \frac{|x_i - y_i|}{\sigma_i + \alpha} \quad \text{(EQN. 5)}$$

where a is a smoothing factor.

In step 624, the method 600 determines whether the distance, d(x,y), calculated in step 620 exceeds a predefined threshold. If the method 600 concludes in step 624 that the distance, d(x,y), exceeds the predefined threshold, the method 600 proceeds to step 626 and outputs a dialog warning (i.e., to the dialog correlation engine 204 of FIG. 2). The method 600 then terminates in step 628. Alternatively, if the method 600 concludes in step 624 that the distance, d(x,y), does not exceed the predefined threshold, the method 600 terminates directly in step 628 (i.e., there is no anomaly).

The method 600 provides a lossy n-gram frequency scheme for detecting payload exploitation that is more efficient than full n-gram schemes. The runtime performance of the method 600 is more comparable to a 1-gram scheme. However, experimental results have shown that the method 600 will not have a substantially higher false positive rate, or incur significantly more penalties for false negatives, than a full n-gram scheme.

As discussed above, one embodiment of a system 200 for detecting bot infections relies in part on the correlation of dialog warnings produced by the various components of the intrusion alert generation engine 202. In one embodiment, the dialog correlation engine 204 tracks sequences of IDS dialog warnings that occur between each local host and the external entities involved in the dialog exchanges that trigger the warnings. Dialog warnings are tracked over a temporal window, where each dialog warning contributes to an overall infection sequence score that is maintained on a per-host basis. In one embodiment, the dialog correlation engine 204 employs a weighted threshold scoring function that calculates a dialog score for the set of dialog warnings associated with the received dialog warning. In one embodiment, the present invention employs two potential criteria for determining bot infection: (1) observation of an incoming infection warning (i.e., E2 transaction) followed by outbound local host coordination or exploit propagation warnings (i.e., E3-E5 transactions); or (2) observation of a minimum of at least two forms of outbound bot dialog warnings (i.e., E3-E5 transactions).

To accommodate these requirements, a threshold value, T, is defined, and a dialog score for host i at interval t is calculated as:

$$s_i(t) = \sum_{i=1}^{5} B_i e_i(t) \quad (\text{EQN. 6})$$

where $B_i$ is a Boolean variable that has a value of one if event $E_i$ has dialog warnings in the time interval, t, and a value of zero if otherwise. $e_i$ is the weight for event $E_i$. In one embodiment, a weighting scheme is empirically derived as: $e_1=0.20$; $e_2=0.30$; $e_3=0.50$; $e_4=0.50$; and $e_5=0.50$. This scheme substantially ensures that no combination of events can satisfy the threshold value, T, without at least one outbound dialog warning (i.e., E3, E4, or E5 transaction), and that two outbound dialog warnings are sufficient to satisfy the threshold value, T. In one embodiment, the weighting scheme is user configurable.

In step 716, the method 700 determines whether the dialog score exceeds the threshold value, T (i.e., whether $s_i(t) > T$). In one embodiment, T=0.8. If the method 700 concludes in step 716 that the dialog score does not exceed the threshold value, the method 700 proceeds to step 714 and discards the set of dialog warnings associated with the received dialog warning (for lack of sufficient evidence), before returning to step 704 to await the next dialog warning.

Alternatively, if the method 700 concludes in step 716 that the dialog score exceeds the threshold value, the method 700 proceeds to step 718 and outputs an infection profile before returning to step 704 to await the next dialog warning. In one embodiment, the infection profile represents a full analysis of roles of the dialog participants, summarizes the dialog warnings based on the transaction classes (i.e., E1-E5) that the dialog warnings indicate, and computes the infection time interval. The summary of dialog warnings comprises the raw alerts specific to the dialog, listed in an organized manner, and perhaps including additional detail about the events that triggered the dialog warnings. In one embodiment, the infection profile includes at least one of: the dialog score (i.e., as calculated in step 712), the IP address of the victim (infected machine), at least one attacker (infection source), and C&C server, dialog observation time, and reporting time.

The present invention provides a bot infection detection system that is highly scalable and reliable (low false positive rate). The system of the present invention may be adapted for use with a variety of different network intrusion detection systems (e.g., implemented as the core of the alert generation engine). Moreover, as bots evolve, the set of dialog transactions on which the system focuses could be extended or otherwise modified to reflect the evolving threat landscape.

Figure 9:
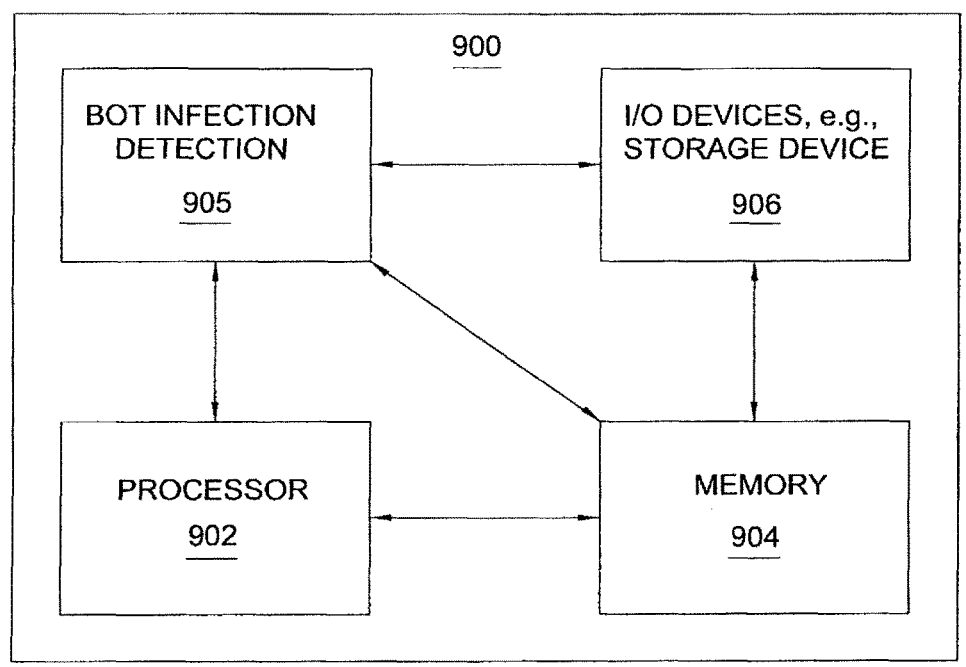
FIG. 9 is a high level block diagram of the bot infection detection method that is implemented using a general purpose computing device.

FIG. 9 is a high level block diagram of the bot infection detection method that is implemented using a general purpose computing device 900. In one embodiment, a general purpose computing device 900 comprises a processor 902, a memory 904, a bot infection detection module 905 and various input/output (I/O) devices 906 such as a display, a keyboard, a mouse, a modem, a network connection and the like. In one embodiment, at least one I/O device is a storage device (e.g., a disk drive, an optical disk drive, a floppy disk drive). It should be understood that the bot infection detection module 905 can be implemented as a physical device or subsystem that is coupled to a processor through a communication channel.

Alternatively, the bot infection detection module 905 can be represented by one or more software applications (or even a combination of software and hardware, e.g., using Application Specific Integrated Circuits (ASIC)), where the software is loaded from a storage medium (e.g., I/O devices 906) and operated by the processor 902 in the memory 904 of the general purpose computing device 900. Additionally, the software may run in a distributed or partitioned fashion on two or more computing devices similar to the general purpose computing device 900. Thus, in one embodiment, the bot infection detection module 905 for detection bot infections at local hosts described herein with reference to the preceding figures can be stored on a computer readable medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A computer-implemented method for detecting a self-propagating malware ("bot") infection on a computer network, the method comprising:

monitoring a plurality of network communication flows between local host computers of the network and external entities on the Internet;

generating an alert, if a subset of the network communication flows is indicative of a malware infection, without intercepting the subset of the network communication flows;

accessing a bot infection dialog model, the bot infection dialog model comprising a plurality of partially ordered combinations of network dialog transactions, wherein a partially ordered combination of network dialog transactions is associated with a particular type of bot infection;

using the bot infection dialog model, outputting a bot infection profile when a combination of alerts generated over a time interval exceeds a threshold.

2. The method of claim 1, comprising outputting a bot infection profile if the combination of generated alerts evidences at least two outbound dialog transactions and does not evidence any inbound dialog transactions.

3. The method of claim 1, comprising outputting the bot infection profile if the combination of generated alerts evidences a sparse sequence of network dialog transactions in the bot infection dialog model.

4. The method of claim 1, comprising defining a weighting and threshold scheme for a network dialog transaction and outputting the bot infection profile if the combination of generated alerts satisfies the weighting and threshold scheme.

5. The method of claim 1, wherein the bot infection dialog model defines a first combination of network dialog transactions as indicative of a command and control botnet, and defines a second combination of network dialog transactions as indicative of a spam bot, and defines a third combination of network dialog transactions as indicative of a peer-to-peer botnet.

6. The method of claim 1, wherein the bot infection dialog model defines a plurality of different mal ware propagation paths for at least one of the network dialog transactions.

7. The method of claim 1, wherein the bot infection dialog model defines an at least partially ordered sequence of network dialog transactions as indicative of a worm infection.

8. The method of claim 1, comprising determining that a combination of alerts comprises at least two pieces of evidence of outward bot coordination, and outputting the bot infection profile based on the evidence of outward bot coordination.

9. The method of claim 1, comprising determining that a combination of alerts comprises at least two pieces of evidence of attack propagation, and outputting the bot infection profile based on the evidence of attack propagation.

10. A self-propagating malware ("bot") infection detection module embodied in a computing device, the bot infection detection module comprising:
one or more network event detection engines configured to, periodically, over time: (i) monitor a plurality of network communication flows between local host computers of the network and external entities on the Internet; and (ii) generate an alert, if a subset of the network communication flows is indicative of a malware infection, without intercepting the subset of the network communication flows;
a bot infection dialog model configured to define a plurality of partially ordered combinations of different types of network dialog transactions, wherein a partially ordered combination of network dialog transactions is associated with a particular type of bot infection; and
a dialog correlation engine configured to output a bot infection profile when a combination of alerts generated over a time interval exceeds a threshold.

11. The bot infection detection module of claim 10, wherein the one or more network event detection engines comprises an intrusion detection system configured to perform real-time network traffic analysis of the network communication flows, a scan anomaly detection engine configured to monitor the network communication flows for evidence of inbound malware scans, and a payload anomaly detection engine configured to monitor the network communication flows for inbound packets indicative of inbound infection or inbound exploit.

12. The bot infection detection module of claim 11, wherein the dialog correlation engine is configured to detect a bot infection based on a correlation of alerts produced by the intrusion detection system, alerts produced by the scan anomaly detection engine, and alerts produced by the payload anomaly detection engine.

13. The bot infection detection module of claim 10, wherein the dialog correlation engine is configured to detect a combination of generated alerts exceeding a weighted threshold and generate the bot infection profile in response to the combination of generated alerts exceeding the weighted threshold.

14. The bot infection detection module of claim 10, wherein the one or more network event detection engines is configured to generate an alert in response to an application of one or more rules to the subset of network communication flows.

15. The bot infection detection module of claim 10, wherein the one or more network event detection engines is configured to calculate an anomaly score based on a number of failed inbound scan attempts, and generate an alert comprising the anomaly score.

16. The bot infection detection module of claim 10, wherein the one or more network event detection engines is configured to calculate a plurality of anomaly scores based on a number of outbound scan attempts, and generate an alert if one or more of the anomaly scores is greater than or equal to a pre-defined threshold.

17. The bot infection detection module of claim 10, wherein the one or more network event detection engines is configured to analyze a payload of a current packet sent to a local host in relation to a profile of normal traffic to the host, and generate an alert if a deviation distance of the payload of the current packet from the profile of the normal traffic exceeds a pre-defined threshold.

18. A dialog correlation engine embodied in one or more non-transitory computer readable storage media and configured to cause a computing device to:
over a time interval, receive a plurality of alerts from one or more network event detection engines monitoring a plurality of network communication flows between local host computers of a computer network and external entities on the Internet, each alert generated by a network event detection engine, in response to a subset of the network communication flows being indicative of a malware infection, without intercepting the subset of the network communication flows;
access a bot infection dialog model, the bot infection dialog model comprising a plurality of partially ordered combinations of network dialog transactions, wherein a partially ordered combination of network dialog transactions is associated with a particular type of self-propagating malware ("bot") infection; and output a bot infection profile when a combination of alerts generated over a time interval exceeds a threshold.

19. The dialog correlation engine of claim 18, configured to cause the computing device to correlate alerts generated by a plurality of different network detection engines and map the alerts generated by the different network detection engines to the network dialog transactions of the bot infection dialog model.

20. The dialog correlation engine of claim 18, configured to cause the computing device to calculate a dialog score based on the alerts received during the time interval, compare the dialog score to a threshold value, and if the dialog score does not exceed the threshold value, discard the alerts without outputting the bot infection profile.

* * * * *